(12) United States Patent
Chinn

(10) Patent No.: US 11,213,439 B2
(45) Date of Patent: Jan. 4, 2022

(54) MODULAR STRETCHER OR LITTER

(71) Applicant: Ferno-Washington, Inc., Wilmington, OH (US)

(72) Inventor: Robert Chinn, Alpharetta, GA (US)

(73) Assignee: Ferno-Washington, Inc., Wilmington, OH (US)

( * ) Notice: Subject to any disclaimer, the term of this patent is extended or adjusted under 35 U.S.C. 154(b) by 517 days.

(21) Appl. No.: 15/513,269

(22) PCT Filed: Oct. 1, 2015

(86) PCT No.: PCT/US2015/053550
§ 371 (c)(1),
(2) Date: Mar. 22, 2017

(87) PCT Pub. No.: WO2016/054407
PCT Pub. Date: Apr. 7, 2016

(65) Prior Publication Data
US 2017/0246059 A1    Aug. 31, 2017

Related U.S. Application Data

(60) Provisional application No. 62/058,459, filed on Oct. 1, 2014.

(51) Int. Cl.
*A61G 1/04* (2006.01)
*A61G 1/048* (2006.01)
(Continued)

(52) U.S. Cl.
CPC ............... *A61G 1/04* (2013.01); *A47C 19/02* (2013.01); *A61G 1/00* (2013.01); *A61G 1/013* (2013.01);
(Continued)

(58) Field of Classification Search
CPC .......... A61G 1/04; A61G 1/013; A61G 1/017; A61G 1/02; A61G 1/048; A61G 1/025;
(Continued)

(56) References Cited

U.S. PATENT DOCUMENTS 2,391,928 A * 1/1946 Seib ................. A61G 1/003
5/625
3,826,528 A * 7/1974 East ................. A61G 1/0562
296/20

(Continued)

FOREIGN PATENT DOCUMENTS

| EP | 2581071 A1 | 4/2013 |
|---|---|---|
| WO | 2007123571 A1 | 11/2007 |
| WO | 2014124471 A1 | 8/2014 |

OTHER PUBLICATIONS

International Search Report and Written Opinion completed Jan. 12, 2016, pertaining to PCT/US15/53550 filed Oct. 1, 2015.
(Continued)

*Primary Examiner* — Nicholas F Polito
*Assistant Examiner* — Morgan J McClure
(74) *Attorney, Agent, or Firm* — Dinsmore & Shohl, LLP

(57) ABSTRACT

A stretcher which comprises a bed, and a frame having first and second parallel frame members coupled to first and second lateral frame members is disclosed. A securement track is define by an upper surface of at least one of the first parallel frame member, the second parallel frame member, the first lateral frame member, and the second lateral frame member, the securement track having a plurality of alternating open regions and necked down regions along a length. A bed mount configured to both support the bed and be releasably secured in the securement track in a secure condition, and configured to be repositionable along the length of the securement track in an unsecured condition.

13 Claims, 14 Drawing Sheets

(51) Int. Cl.
*A61G 1/00* (2006.01)
*A61G 1/02* (2006.01)
*A47C 19/02* (2006.01)
*F16M 13/02* (2006.01)
*A61G 1/013* (2006.01)
*A61G 1/017* (2006.01)
*A61G 7/10* (2006.01)
*A61G 7/16* (2006.01)

(52) U.S. Cl.
CPC ............... *A61G 1/017* (2013.01); *A61G 1/02* (2013.01); *A61G 1/0231* (2013.01); *A61G 1/048* (2013.01); *F16M 13/02* (2013.01); *A61G 7/1025* (2013.01); *A61G 7/16* (2013.01)

(58) Field of Classification Search
CPC .......... A61G 1/042; A61G 1/052; A61G 7/16; A61G 7/1025; F16M 13/02
See application file for complete search history.

(56) References Cited

U.S. PATENT DOCUMENTS

| | | | | |
|---|---|---|---|---|
| 3,918,554 | A * | 11/1975 | Bourgraf | A61G 1/0212 188/32 |
| 4,037,871 | A * | 7/1977 | Bourgraf | A61G 1/06 296/20 |
| 4,355,631 | A * | 10/1982 | LeVahn | A61B 17/0293 600/230 |
| 4,534,075 | A * | 8/1985 | Schnitzler | A61F 5/3776 296/20 |
| 4,602,756 | A * | 7/1986 | Chatfield | A61G 7/0503 248/222.14 |
| 4,742,822 | A * | 5/1988 | Guerriero | A61F 5/3776 5/628 |
| 5,509,159 | A * | 4/1996 | Du-Bois | A61G 1/013 296/20 |
| 5,860,176 | A * | 1/1999 | Norberg | A61G 1/00 128/870 |
| 6,161,237 | A * | 12/2000 | Tang | A61B 6/0421 378/209 |
| 6,175,977 | B1 * | 1/2001 | Schumacher | A61G 1/04 128/845 |
| 6,389,623 | B1 * | 5/2002 | Flynn | A61G 1/0567 296/20 |
| 7,520,007 | B2 * | 4/2009 | Skripps | A61G 13/04 24/459 |
| 7,676,861 | B2 * | 3/2010 | Ward | A61G 1/013 5/428 |
| 8,459,602 | B2 * | 6/2013 | Herskovic | A61G 7/0503 248/229.13 |
| 9,144,409 | B1 * | 9/2015 | Ocel | A61B 5/0555 |
| 2002/0042952 | A1 * | 4/2002 | Smeed | A61G 1/04 5/503.1 |
| 2003/0115671 | A1 * | 6/2003 | Smeed | A61G 1/04 5/503.1 |
| 2004/0034935 | A1 * | 2/2004 | Ferneau | A61G 1/0567 5/618 |
| 2008/0190947 | A1 * | 8/2008 | Bourgraf | F17C 13/084 220/737 |
| 2009/0000035 | A1 * | 1/2009 | Awerbuch | A61G 1/013 5/627 |
| 2009/0308400 | A1 * | 12/2009 | Wilson | A61F 5/3769 128/845 |
| 2012/0186588 | A1 * | 7/2012 | Wilson | A61F 5/3769 128/845 |
| 2015/0040319 | A1 * | 2/2015 | Doak | A61G 13/105 5/620 |
| 2015/0083121 | A1 * | 3/2015 | Fisher | A61M 16/024 128/202.22 |
| 2016/0031382 | A1 * | 2/2016 | Chinn | F16M 13/02 248/222.11 |
| 2016/0158076 | A1 * | 6/2016 | Hobbs | A61G 7/1051 5/627 |
| 2016/0324701 | A1 * | 11/2016 | Cambridge | A61G 13/101 |
| 2017/0014284 | A1 * | 1/2017 | Chandler | A61G 1/0256 |
| 2018/0110662 | A1 * | 4/2018 | Doak | A61G 1/04 |

OTHER PUBLICATIONS

Extended European Search Report completed Apr. 24, 2018, pertaining to Application No. EP15847001.3 filed Oct. 1, 2015.

* cited by examiner

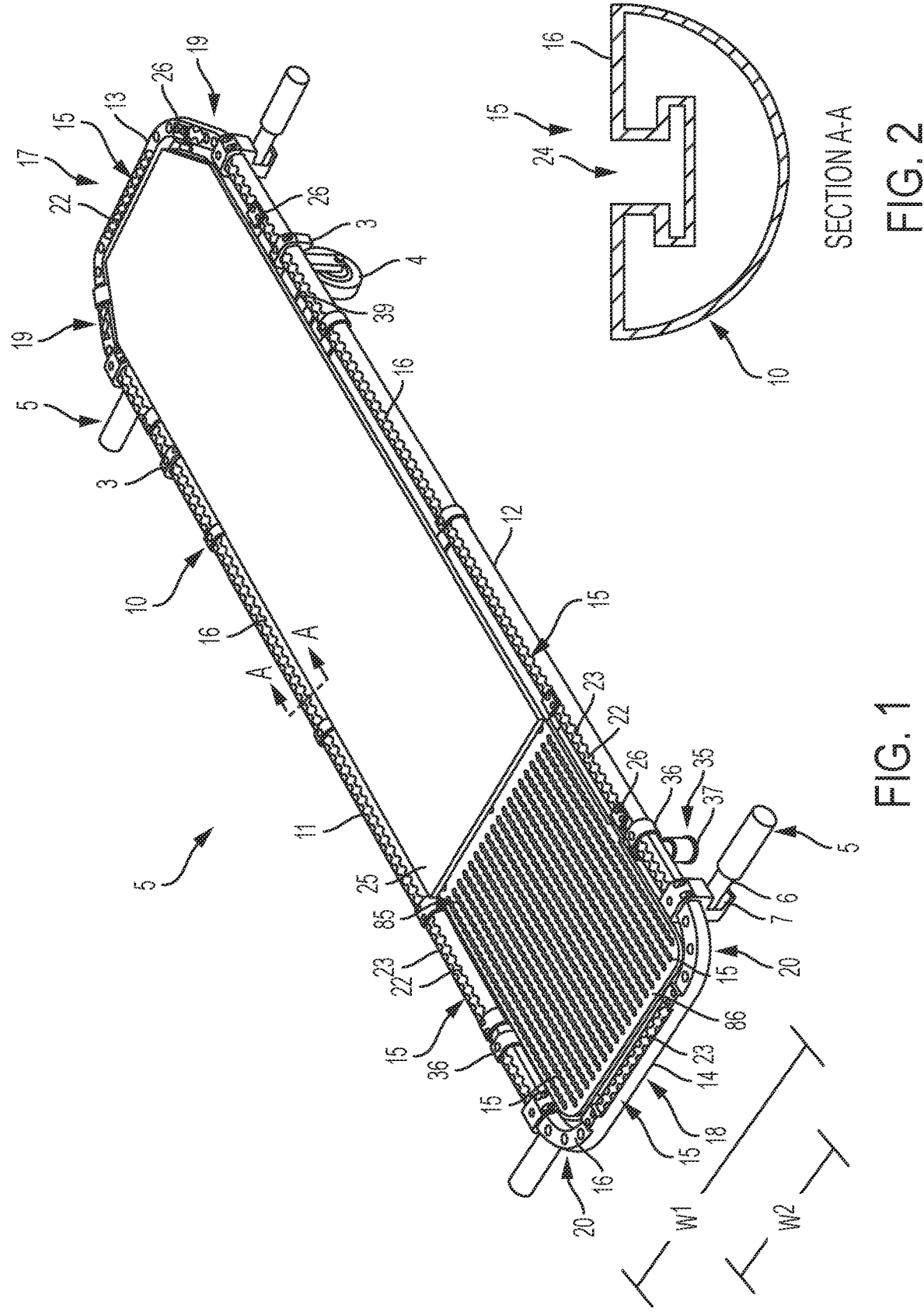

MODULAR STRETCHER OR LITTER

CROSS REFERENCE TO RELATED APPLICATIONS

The present application hereby claims the benefit of Provisional U.S. Application No. 62/058,459 filed Oct. 1, 2014.

BACKGROUND

Equipment and device manufactures do not have a standard for mounting their hardware to surfaces or other equipment or devices. This can inhibit quick configuration of the stretcher or litter for different situations encountered by a user and in some cases require the use of specialized tools. Mounting equipment and devices on a stretcher or litter are also dependent on the manufacturer's chosen mounting locations. This may require individual adaptation for each piece of equipment or device to mount to specific locations on a stretcher or litter which may be time consuming and labor intensive. Furthermore, if the piece of equipment or device is desired to be moved, the amount of time and effort is increased to re-mount the piece of equipment or device in a new location. A manufacturer may entertain adding quick mounting hardware to their equipment or devices for addition money paid for by the customer but the new hardware may not be compatible with other manufacturer's hardware.

The problem is compounded if the piece of equipment or device is desired to be mounted to a mobile structure. The rigors that the securing fasteners must endure are increased over static applications. Furthermore, the users may be away from a service area and may require relocation of the equipment or devices or a different configuration of equipment or devices without the need for tools.

Accordingly, a need exists for alternative approaches to secure and easily relocate equipment or devices on a stretcher or litter.

SUMMARY

In one embodiment, a stretcher may include a bed, and a frame having first and second parallel frame members coupled to first and second lateral frame members is disclosed. A securement track is define by an upper surface of at least one of the first parallel frame member, the second parallel frame member, the first lateral frame member, and the second lateral frame member, the securement track having a plurality of alternating open regions and necked down regions along a length. A bed mount configured to both support the bed and be releasably secured in the securement track in a secure condition, and configured to be repositionable along the length of the securement track in an unsecured condition.

In another embodiment, a litter may include a frame a plurality of handles, and a plurality of bed mounts. The frame may include a first frame member, a second frame member, a third frame member, a fourth frame member, a plurality of connecting tees, and a securement track. The third frame member couples the first frame member and the second frame member at a first end of the frame using connecting tees and the fourth frame member couples the first frame member and the second frame member at a second end of the frame using connecting tees. The securement track is disposed on an upper surface of the frame and comprises a plurality of open regions and a plurality of necked down regions and the plurality of open regions are connected by the plurality of necked down regions. Each handle comprises a handle member coupled to a handle mount. The handle mount is coupled to connecting tee and the handle member is pivotally coupled to a respective handle mount.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and not intended to limit the subject matter defined by the claims. The following detailed description of the illustrative embodiments can be understood when read in conjunction with the following drawings, where like structure is indicated with like reference numerals and in which:

FIG. 1 depicts a perspective view of a stretcher according to one or more embodiments shown and described herein;

FIG. 2 depicts a cross section of a frame of the stretcher of FIG. 1, taken along section A-A according to one or more embodiments shown and described herein;

DETAILED DESCRIPTION

Figure 3A:
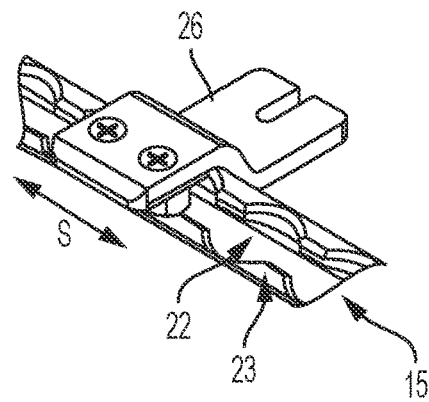
FIG. 3A depicts an isometric top view bed mount shown coupled to the frame of the stretcher of FIG. 1 according to one or more embodiments shown and described herein.

As generally shown in the various configurations of FIGS. 1, 4C, 7A, 8, 10, 11, 12 and 14, a universal, modular mounting system for a stretcher is disclosed which allows the use of any manufacture's device or piece of equipment via the use of a universal mount and track provided by the stretcher as shown and described herein. The track is shown around the periphery of the frame in the various illustrated embodiments of the stretcher, along the bed of the stretcher, and on an elevated platform which not only enables the use and relocation of devices and pieces of equipment, but also the reconfiguration of the stretcher itself. For example, the wheels, legs, and handles may be relocated without the need for special tools or custom mounting hardware. The versatility of such a system means that a stretcher or litter may be configured to any situation, on site.

Referring now to FIG. 1, a stretcher 5 is shown with a frame 10 and a bed 25. The frame includes a first parallel frame member 11, a second parallel frame member 12, a first lateral frame member 13, a second lateral frame member 14, and a securement track 15. The frame 10 may define a peripheral edge of the stretcher 5 and include an upper surface 16, a first end 17, and a second end 18. The first lateral frame member 13 couples the first parallel frame member 11 and the second parallel frame member 12 at the first end 17 of the frame 10. The second lateral frame member 14 couples the first parallel frame member 11 and the second parallel frame member 12 at a second end 18 of the frame 10. It is contemplated that the first lateral frame member 13 and the second lateral frame member 14 couple with the first parallel frame member 11 and the second parallel frame member 12 at substantially right angles.

However, as shown in FIG. 1, in one embodiment the first lateral frame member 13 may include first end frame corners 19 that couple with the first parallel frame member 11 and the second parallel frame member 12 respectively. The second lateral frame member 14 may include second end frame corners 20 that couple with the first parallel frame member 11 and the second parallel frame member 12 respectively. It is contemplated that all of the frame members of the frame 10 may couple and decouple from each other, e.g., via the tightening and un-tightening of an interference fit provided by nuts, screws, bolts, locking clamps, etc., and all without the need for breaking welds, glued fittings, molding, and other such permanent connections.

It is contemplated that the stretch width may be changed or configured to any number of stretcher widths. In one embodiment, the first lateral frame member 13 and the second lateral frame member 14 may have a variety of lengths to enable the stretcher 5 to be converted to a variety of widths. As such, the first lateral frame member 13 and the second lateral frame member 14 may have a first length, thus providing the frame 10 and the stretcher 5 a first stretcher width ($w^1$). The first lateral frame member 13 and the second lateral frame member 14 may be decoupled from the rest of the frame 10 and replaced with a second set of lateral frame members that have a second length. In this new configuration, the stretcher 5 has a second stretcher width ($w^2$). It is contemplated that the stretcher width may be changed or configured to any number of stretcher widths.

Figure 8:
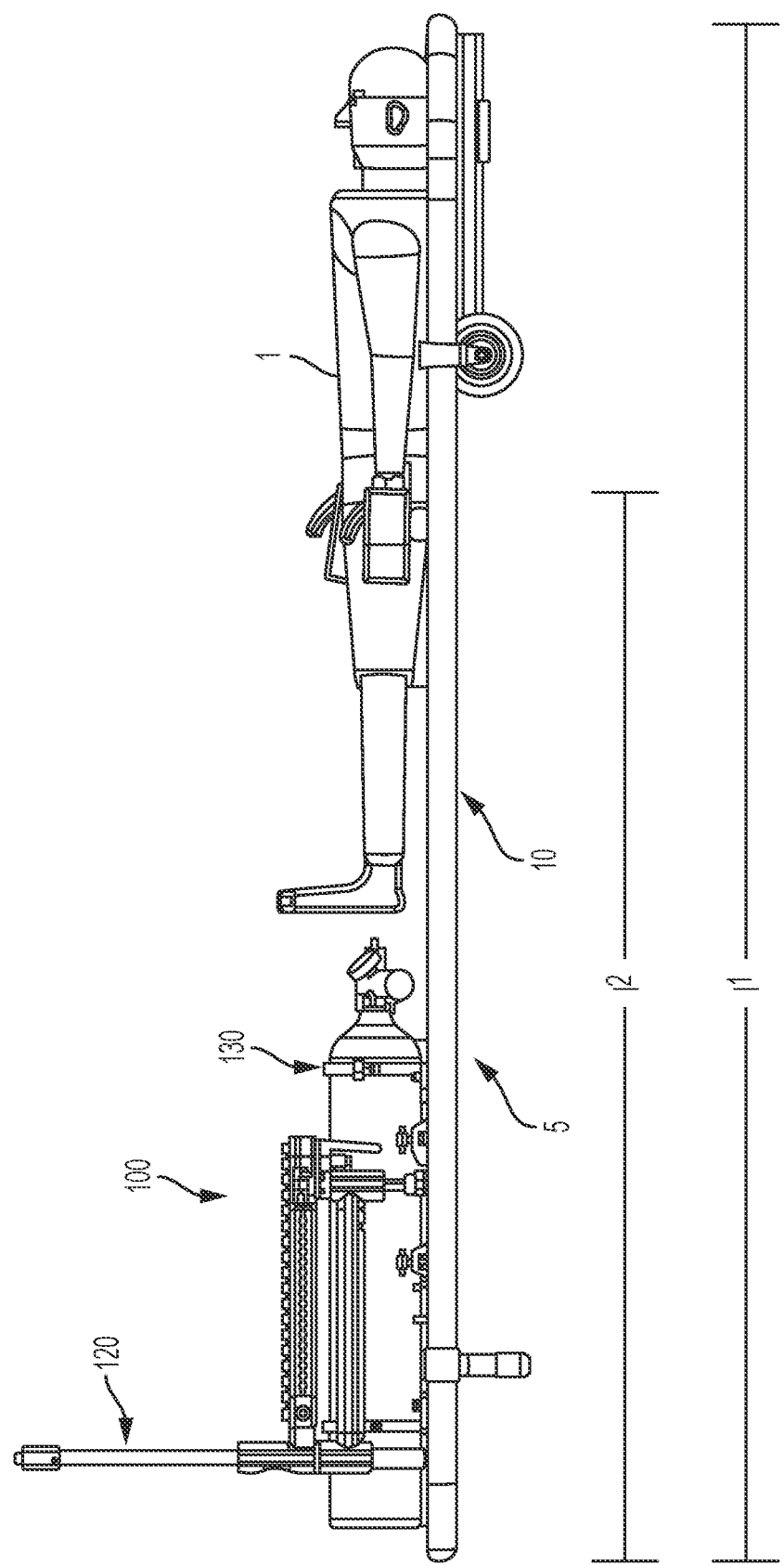
FIG. 8 depicts a side view of the stretcher of FIG. 1 configured with the elevated rack of FIG. 5 and the pair of tank racks of FIG. 7A, and depicted with a patient thereon, according to one or more embodiments shown and described herein.

In addition, it is contemplated that the first parallel frame member 11 and the second parallel frame member 12 may be adjustable in length to meet desired configurations or applications of the stretcher 5. For example, and not by way of limitation, the first parallel frame member 11 and the second parallel frame member 12 may have a first length, thus providing the frame 10 and the stretcher 5 a first stretcher length ($l^1$)(FIG. 8). Continuing this example, the first parallel frame member 11 and the second parallel frame member 12 may be decoupled from the rest of the frame 10 and replaced with a second set of parallel frame members that have a second length. In the new configuration, the stretcher 5 has a second stretcher length ($l^2$)(FIG. 8). It is contemplated that the stretcher length may be changed or configured to any number of stretcher lengths.

Referring to FIGS. 1 and 8, although, the frame 10 is described as reconfigurable, it is contemplated that these components could be fabricated as a single integral unit such as through welding, gluing, permanent connections, molding, and/or other fabrication methods. In one embodiment, the frame 10 and/or the individual components of the frame 10 may be hollow tube-like structures. These tube-like structures may have a substantially D-shaped cross section as shown in FIG. 2. In one embodiment, the first end frame corners 19 and the second end frame corners 20 may include portions with a lesser cross sectional measurement than the main portion of the corners and extend from each end of the main portion of the corners. These portions having the lesser cross sectional measurements are configured such that they may insert into the respective hollow ends an adjourning frame member in order to detachably couple to one another to form the frame 10.

Referring to FIG. 1, one or more of the surfaces of the frame 10 include a securement track 15 disposed therein and/or therealong which is operable to receive one or more corresponding mounts that matedly engage the securement track(s) 15 at various locations along the frame 10. In the embodiment shown in FIG. 1, the upper surface 16 of the frame 10 is the surface chosen for the securement track 15. The securement track 15 includes a plurality of open regions 22 and a plurality of necked down regions 23. The plurality of open regions 22 are connected by the plurality of necked down regions 23. As discussed herein below in greater detail, one or more pieces of equipment or devices may be fixedly or detachably coupled to one or mounts and the mounts may couple to any position along the frame 10 where the securement track 15 is located. The securement track 15 may be the same as or similar to the tracks shown and described in commonly owned and copending PCT/US2014/015898, filed Feb. 11, 2014, titled "Equipment Mounting System" which claims the benefit of U.S. Provisional Application 61/763,045 filed Feb. 11, 2013, titled "Equipment Mounting System" and are hereby incorporated by reference herein in their entirety. The mounts shown and described herein may operate the same as or similar to the mounts shown and described in PCT/US2014/015898. In all embodiments, the mounts are configured to couple with the securement track and slide therealong into a desired position. In some embodiments, the mounts are configured to be secured or locked into place along the securement track.

Referring to FIG. 2, the securement track 15 may comprise a slot 24 disposed on an upper surface 16 into the frame 10. The slot 24 is substantially T-shaped and includes a plurality of open regions 22 (FIG. 1) and a plurality of neck down regions 23 (FIG. 1). In one embodiment, the securement track 15 of the first end frame corners 19 and second end frame corners 20 may comprise just a slot 24 without any open regions 22 or neck down regions 23. In this embodiment, the slot 24 is continuous around the frame 10. A mount, as described in greater detail hereinafter, may couple with the an open region 22 on one of the parallel frame members or one of the lateral frame members and slide to a position on one of the first end frame corners 19 or the second end frame corners 20.

Referring back to FIG. 1, the stretcher 5 may further include a bed 25 positioned between and connected to the frame 10 to permit a patient to lie thereupon or support equipment or devices, bedding, etc. positioned thereupon. The bed 25 may be fabricated from any number of materials such as, for example, a framework of lateral supports connected between the frame members, a sheet of metal, plastic, composite, or combinations thereof, a mattress, or combinations thereof. In some embodiments, the bed 25 may include one or more of the securement tracks 15 as described above herein and will be further described below herein in relation to a securement plate 85.

Figure 3B:
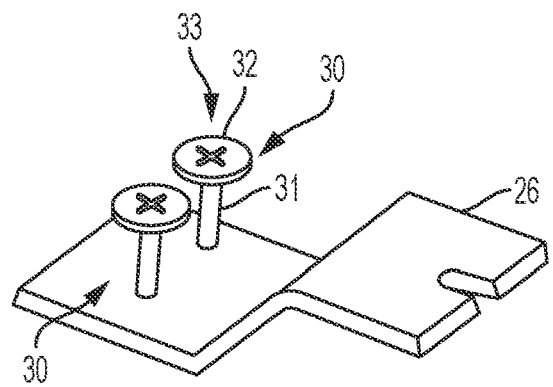
FIG. 3B depicts an isometric bottom view the bed mount of FIG. 3A according to one or more embodiments shown and described herein.

The bed 25 is supported and/or coupled to the frame 10 by one or more bed mounts 26. Referring to FIGS. 3A and 3B, each bed mount 26 comprises a mount stud 30. Each mount stud 30 comprises a stem portion 31 and an enlarged head portion 32 disposed at a distal end 33 of respective stem portions 31. The head portion 32 is configured to removably couple with respective open regions 22 of the securement track 15. The stem portion 31 is configured to slidably couple with the necked down region 23 of the securement track 15. In other words, the bed mount 26 is releasably secured in the securement track 15 in a secure condition, and configured to be repositionable along the length of the securement track in an unsecured condition. In the unsecured condition, the bed mount 26 may be slid and/or repositioned anywhere along the securement track 15 along the arrow S. Referring back to FIG. 1, the bed mounts 26 are shown coupled to the securement track 15 and spaced around the frame 10 to support the bed 25. Refer to PCT/US2014/015898 for more information about the structure and engagement of the mount studs 30 and the securement track 15.

In one embodiment, the bed 25 may include a securement plate 85 comprising a base plate 86 and a plurality of substantially parallel securement tracks 15. The base plate 86 is coupled to the frame 10 with a plurality of bed mounts 26. The bed 25 and/or the angular support bed 43 may include one or more securement tracks 15 disposed therein or thereon (for example, FIG. 3). In certain embodiment, each one of the one or more securement tracks 15 may be positioned adjacent to at least one other of the one or more securement tracks 15 in a substantially parallel orientation as shown, for example, in FIG. 3 to form a plurality of securement tracks 15. The tracks 15 may run along and parallel to a longitudinal axis of the stretcher 5 or transverse (for example, parallel) to the longitudinal axis of the stretcher 10.

The stretcher 5 may also comprise one or more legs 35. Each leg 35 may include a leg member 37 coupled to a leg mount 36. The leg member 37 extends outwardly away from the frame 10 and is configured to support the frame 10, and any load on the frame 10, upon a surface. It is contemplated that each leg 35, either together or individually, may have a length which defines the height at which the frame 10 is situation above a surface. The leg mount 36 includes one or more mount studs (i.e., mount stud 30, FIG. 3B) and is configured to couple with the securement track 15, slide therealong, and once in a desired location, be secured or locked into place.

The stretcher 5 may also include one or more ribs 38. Each rib 38 may include a rib lateral 39 coupled to two rib mounts 3 at either end of the rib later 39. Each rib 38 is coupled between the first parallel frame member 11 and the second parallel frame member 12 by the coupling of the rib mounts 3 with the securement track 15 on the frame 10. Each rib mount 3 includes one or more mount studs (i.e., mount stud 30, FIG. 3B) and is configured to couple with the securement track 15, slide therealong, and once in a desired location, be secured or locked into place. In one embodiment, select one of the ribs 28 may include one or more wheels 4. It is contemplated that the configurations of the wheels 4 and/or legs 35 is dependent upon the desired use of the stretcher 5 and the environment in which it will be used.

Figure 3C:
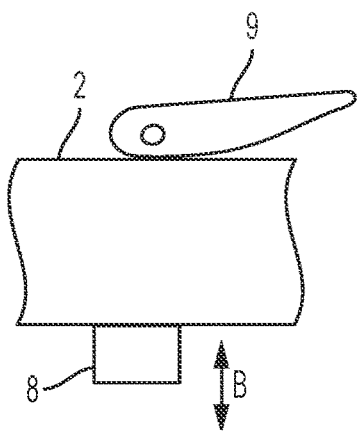
FIG. 3C depicts a side view of a mount coupleable to the frame of the stretcher of FIG. 1 according to one or more embodiments shown and described herein.
Figure 3D:
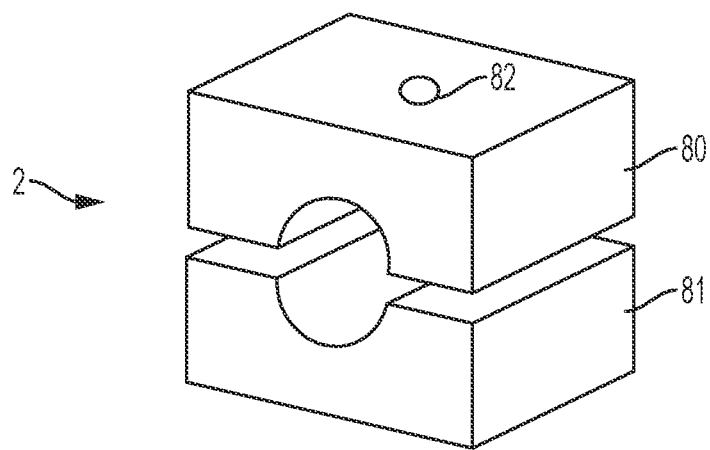
FIG. 3D depicts an isometric view of another embodiment of a mount coupleable to the frame of the stretcher of FIG. 1 according to one or more embodiments shown and described herein.
Figure 3E:
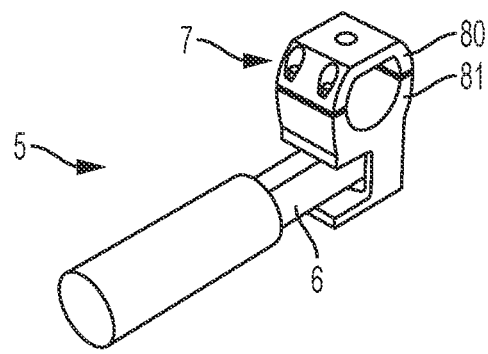
FIG. 3E depicts an isometric view of a handle shown coupled to the frame of the stretcher of FIG. 1 according to one or more embodiments shown and described herein.

Referring to FIGS. 1 and 3E, the stretcher may also include one or more handles 5 positioned and secured at different points along the frame 10. Each handle 5 may include a handle member 6 and a handle mount 7. The handle member 6 extends outwardly away from the frame 10 and is configured to provide a location for a user or users to lift and carry the stretcher 5. The handle member 6 may be pivotally couple or fixedly coupled to the handle mount 7. The handle mount 7 includes one or more mount studs (i.e., mount stud 30, FIG. 3B) and is configured to couple with the securement track 15, slide therealong, and once in a desired location, be secured or locked into place. In one embodiment, the stretcher 5 may include four handles 5 connected and/or mounted to the frame 10. Each of the handles 5 may include a swivel joint coupling the handle member 6 to the handle mount 7, permitting the handle member 6 to pivot relative to the handle mount 7 such as, for example, pivot about a vertical axis such that the handle 5 may be in a position perpendicular to the frame member (for example, a hold position) of the frame 10 or in a position substantially parallel to the frame member (for example, a store position) of the frame 10.

Referring to FIG. 3C, each mount 2 (i.e., handle mount 7, rib mount 3, bed mount 26, and leg mount 36) may include a locking pin 8 and a locking pin release 9. The locking pin release 9 is coupled to the locking pin 8 and is configured to transition the locking pin 8 between an extended position and a retracted position as illustrated by arrow B. The extended position extends the locking pin 8 into an open region 22 of the securement track 15 and restrains the movement of the mount 2 in relation to the securement track 15. The retracted position retracts the locking pin 8 out of an open region 22 of the securement track 15 and allows the movement of the mount 2 in relation to the securement track 15. A lever is shown in FIG. 3C as the locking pin release 9 however, it should be understood that any lever, button, slide, etc. may be used which actuates the locking pin 8 between the extended position and the retracted position. It is contemplated, in some embodiments, that in lieu of a locking pin 8 and a locking pin release 9, a fastener such as a screw, bolt, or an adhesive may be used.

Referring to FIG. 3D, in one embodiment, each mount 2 (i.e., handle mount 7, rib mount 3, bed mount 26, and leg mount 36) may include a first clamp side 80 and a second clamp side 81 opposite the first clamp side 80 that engage opposite sides of one of the frame members (11, 12, 13, 14, 19, and 20) of the frame 10. The first clamp side 80 and the second claim side 81 may include a threaded aperture 82 for receiving a bolt or screw that threadably engages the aperture 82 and brings the first clamp side 80 and the second clamp side 81 together onto the frame member (11, 12, 13, 14, 19, and 20) of the frame 10, thereby clamping and securing it in its position on the frame 10. Optionally, the first clamp side 80 may include a pin, such as the locking pin 8 of FIG. 3C, extending radially inward a length such that when the first clamp side 80 is position on frame 10, the pin extends into one of the plurality of open regions 22 in the securement track 15, assisting in securing and/or locking the mount 2 into its position. It should be understood that the mount 2 may be completely disengaged from the securement track 15 and connected and/or mounted to a different securement track 15 on the stretcher 5 or other devices. Referring to FIG. 3E, the handle 5 is shown with an embodiment of the mount 2 with the first clamp side 80 and the second clamp side 81.

Figure 4B:
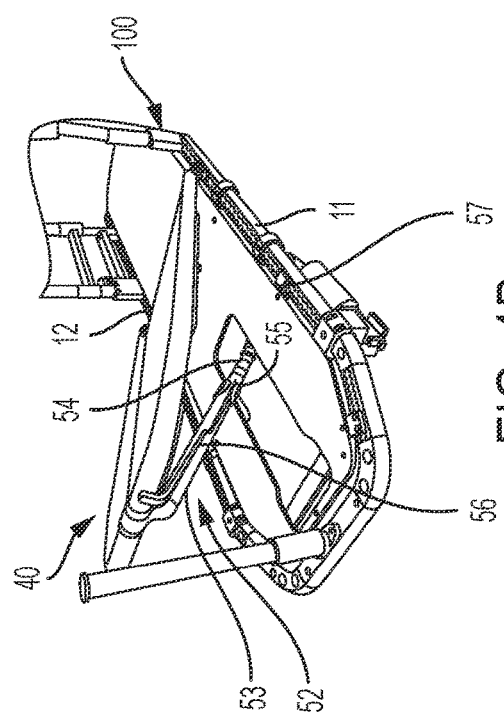
FIG. 4B depicts a rear perspective view of the angular support of FIG. 4A and shown coupled to the frame of a stretcher similar to that depicted by FIG. 1, according to one or more embodiments shown and described herein.
Figure 4C:
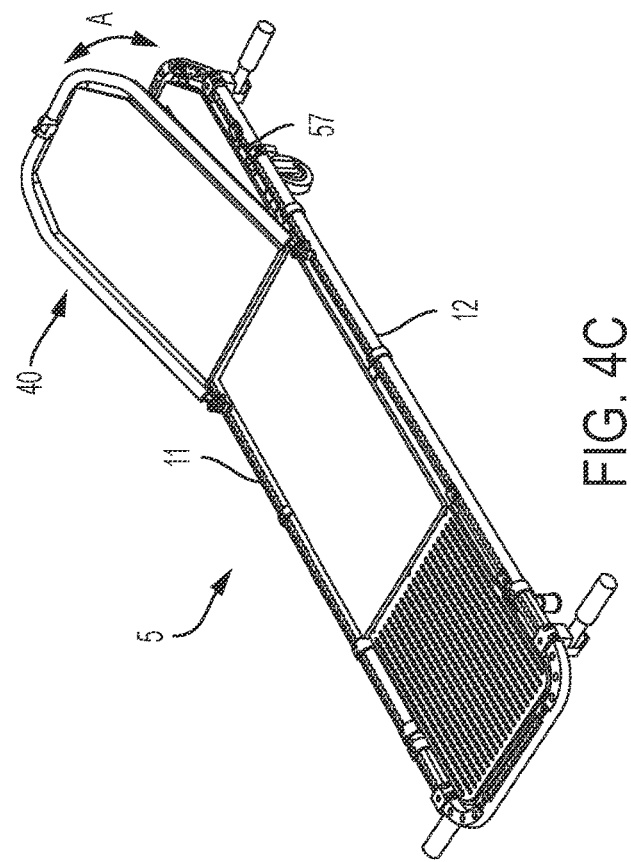
FIG. 4C depicts a front perspective view of the angular support coupled to the stretcher of FIG. 1 according to one or more embodiments shown and described herein.
Figure 4A:
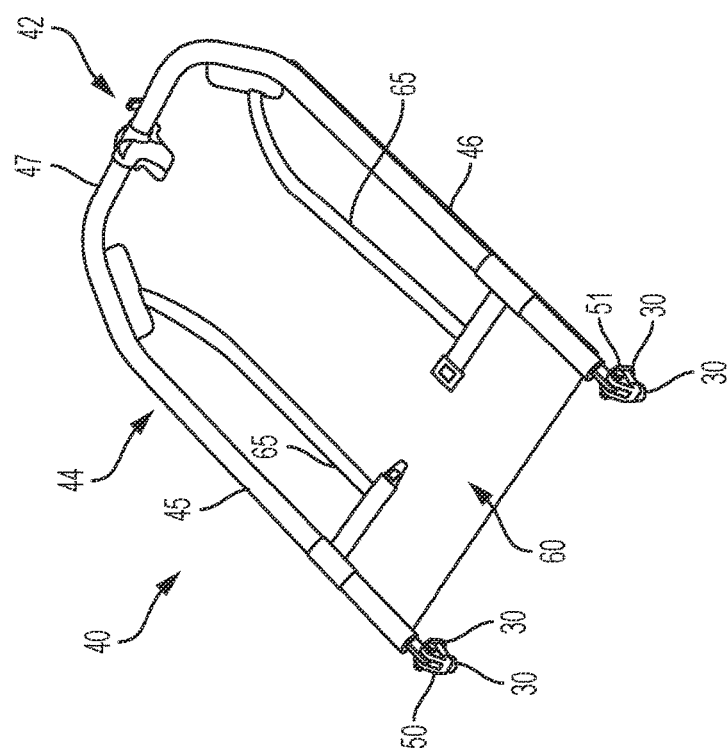
FIG. 4A depicts an isometric view of an angular support coupleable to a frame of a stretcher, such as the stretcher of FIG. 1, according to one or more embodiments shown and described herein.

FIGS. 4A, 4B, and 4C illustrate an angular support 40. The angular support 40 may include a support frame 44, a support bed 70, a first track mount 50, a second track mount 51, a cross member 57, and a link member 52. The support frame 44 comprises a first support member 45, a second support member 46, and a support lateral member 47. The support lateral member 47 couples the first support member 45 and the second support member 46 at the first end 42 of the support frame 44. The first track mount 50 and the second track mount 51 each comprise at least one mount stud 30 and are both pivotally coupled to the support frame 44. Specifically, the first track mount 50 is pivotally coupled to the first support member 45 and the second track mount 51 is pivotally coupled to the second support member 46. The link member 52 comprises a first link body 53, a second link body 54, a link lock 55, and a link lock release 56. The first link body 53 slidably couples with the second link body 54 and the link lock 55 restrains the movement of the first link body 53 in relation to the second link body 54. The link lock release 56 transitions the link lock 55 between a locked position and an unlocked position. The locked position restrains the movement of the first link body 53 in relation to the second link body 54 and the unlocked position does not restrain the movement of the first link body 53 in relation to the second link body 54. The link member 52 couples the angular support 40 to the cross member 57 such that it support and locks the angular support 40 (and any patient or portion of a patient resting thereon) into any number of angular orientations relative to the frame 10. The cross member 57 couples the first parallel frame member 11 and the second parallel frame member 12 of the frame 10. The cross member 57 provides a base from which the angular support 40 may move at an angular orientation relative the frame 10 as indicated by direction arrow A. Angle A is defined as the incline angle of the angular support 40 in relation to a plane defined by the frame 10.

In one embodiment, the link member 52 may be a locking cylinder and/or piston as known in the art, which permits the piston when in the unlock position to contract or expand, and then when in a desired position, the piston can be locked into that position. One example of locking is a threaded ring lock that may tighten such that it prevents any motion of the piston or unscrew such that it permits the piston to contract or expand. Other examples of the link member 52 include, but is not limited to, any conventional lounge chair link members which enable and support an upper torso portion of a lounge chair to pivot and/or lock into any number of angular orientations relative to the frame of the lounge chair.

The support bed 60 may be coupled to the support frame 44 by one or more bed mounts (e.g., bed mount 26 of FIG. 1). In one embodiment, the support bed 60 is fastened to the support frame 44. The support bed 60 may comprise the same or similar materials and/or components as the bed 25. However, the support bed 60 is not required to include or be fabricated by the same materials as the bed 25. The angular support 40 may also include a restraint 65. The restraint 65 may be a belt such as a lap belt, a shoulder belt, a 4-point harness and the like. The restraint 65 may also be a set of straps. The restraint 65 is configured to either restrain a small patient, such as a child or toddler, or the upper torso of an adult patient.

Figure 5:
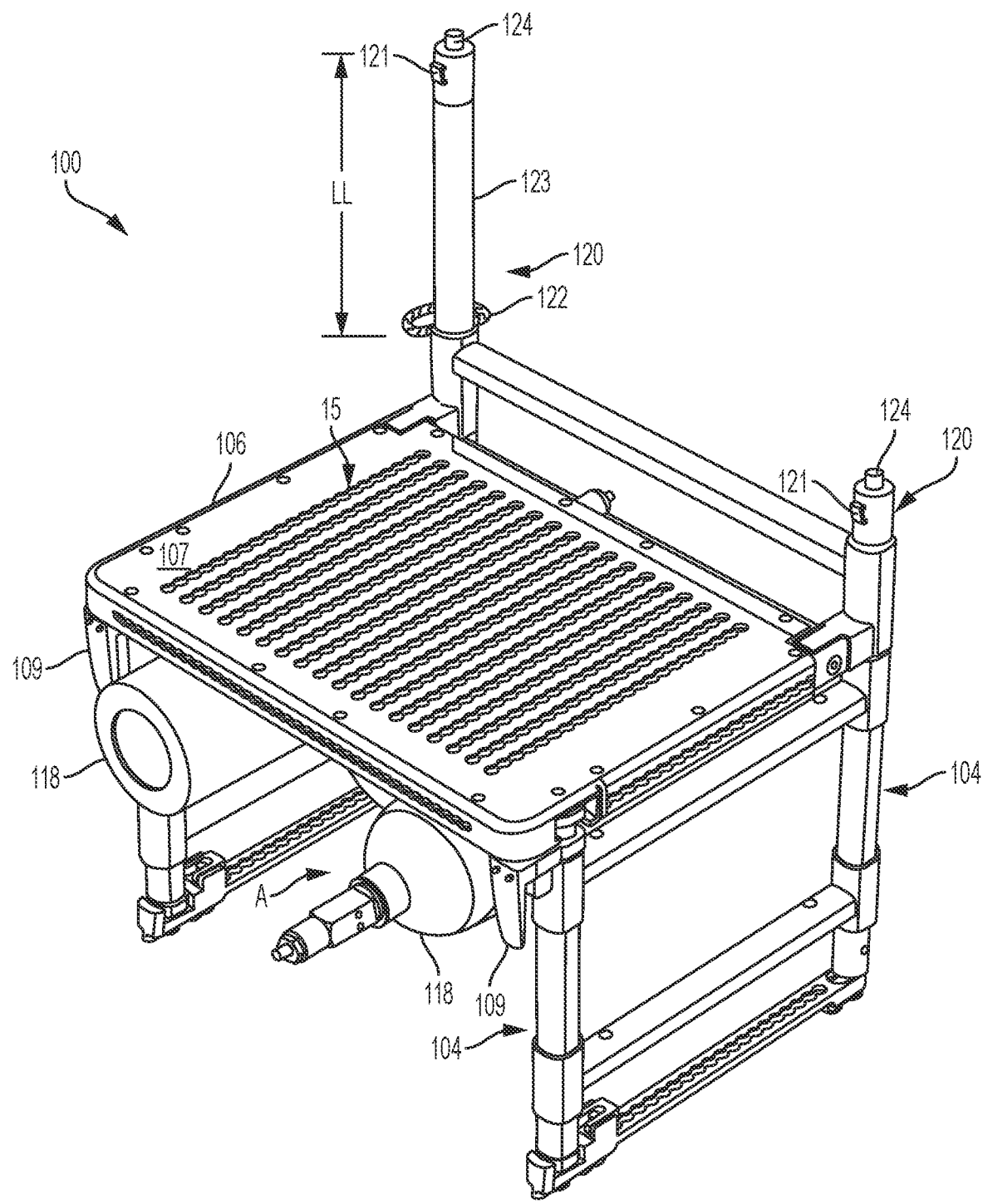
FIG. 5 depicts an isometric view of an elevated rack coupleable to the frame of the stretcher of FIG. 1 according to one or more embodiments shown and described herein.
Figure 6:
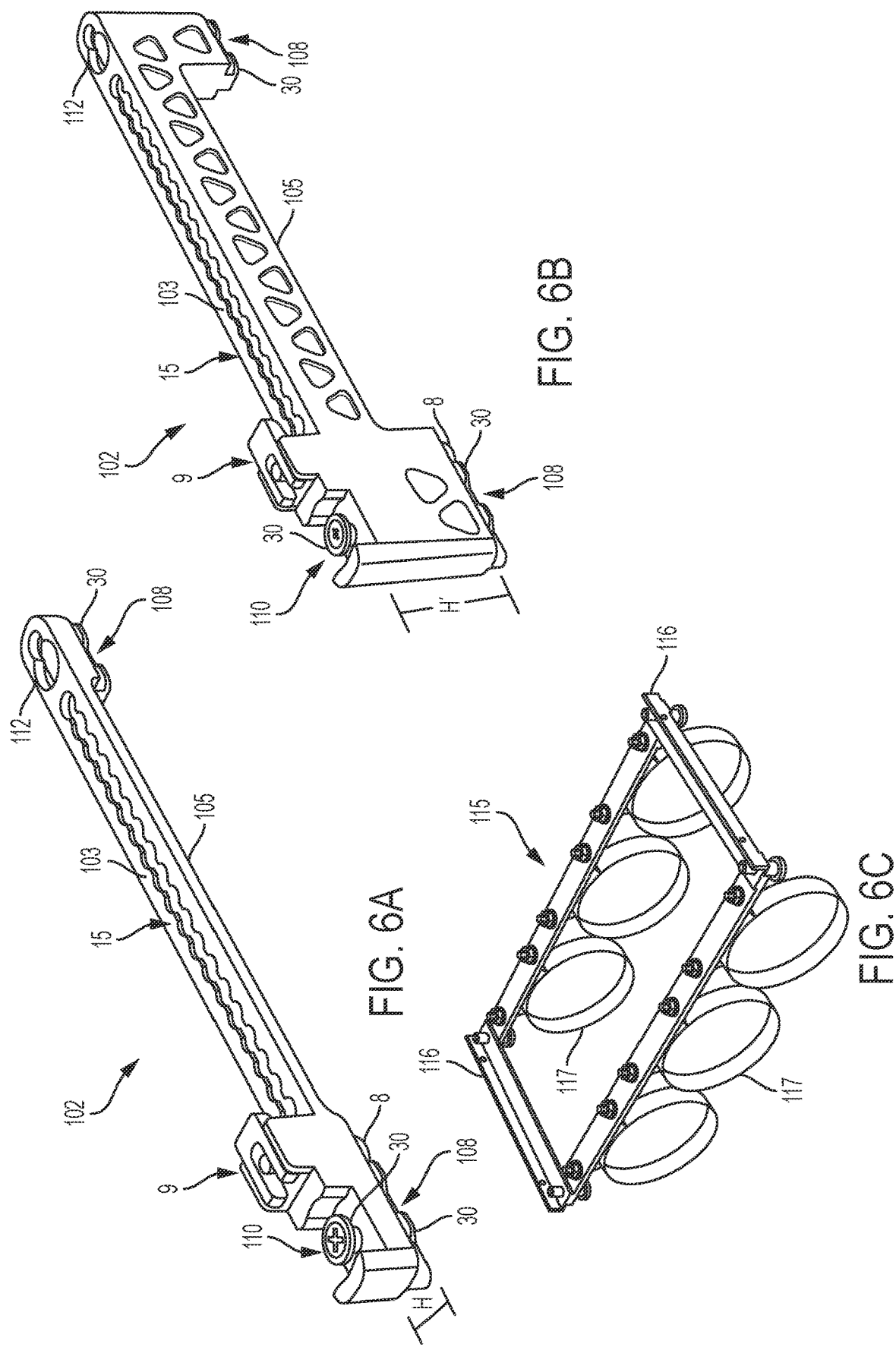
FIG. 6A depicts an isometric view of a riser coupleable to the frame of the stretcher of FIG. 1 according to one or more embodiments shown and described herein.
FIG. 6B depicts an isometric view of another embodiment of a riser, which is similar to the riser of FIG. 6A, according to one or more embodiments shown and described herein.
FIG. 6C depicts an isometric view of a tank assembly coupleable to the frame of the elevated rack of FIG. 5 according to one or more embodiments shown and described herein.
Figure 7:
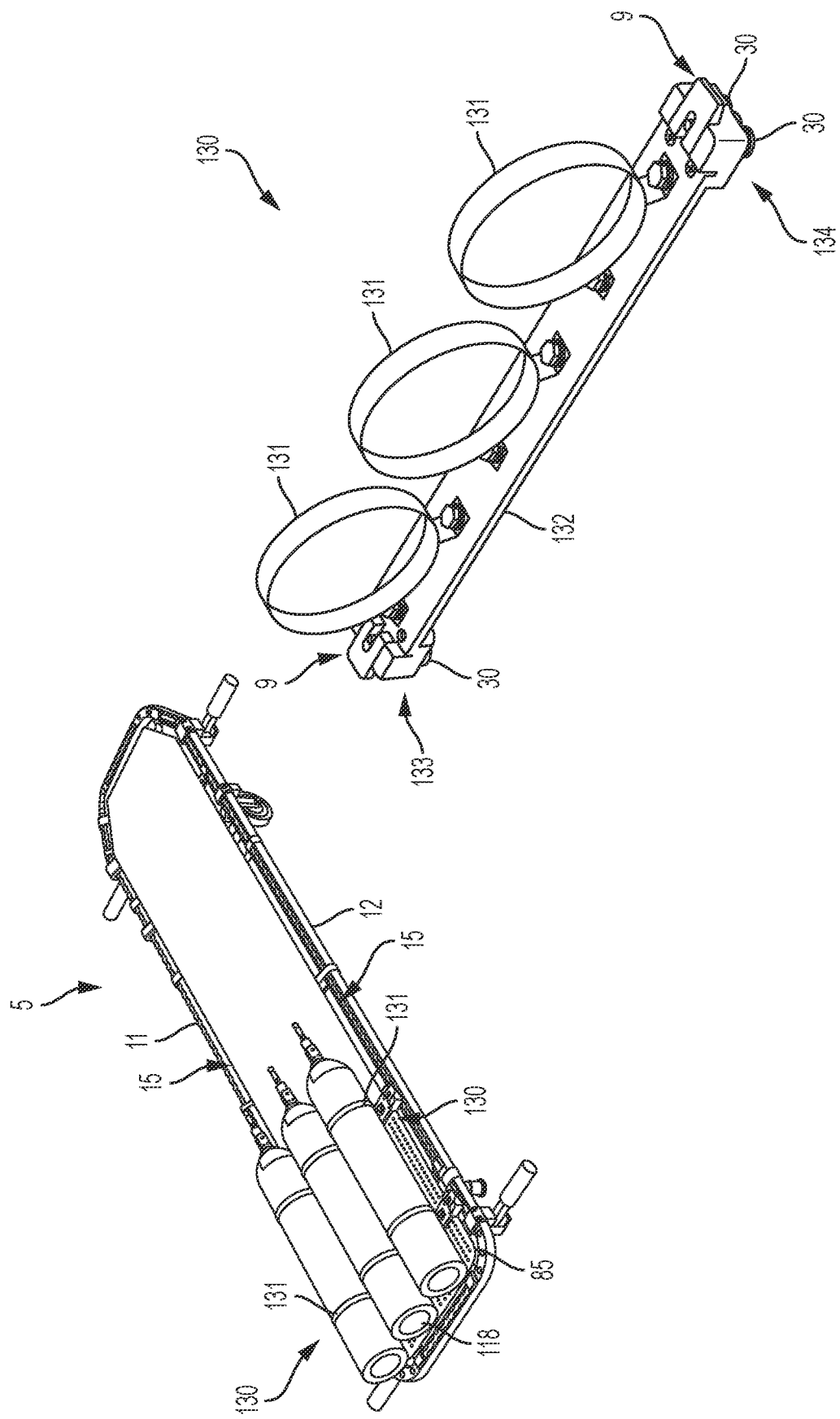
FIG. 7A depicts a perspective view of a pair of tank racks shown holding securely a plurality of tanks and being coupled to the stretcher of FIG. 1 according to one or more embodiments shown and described herein.
FIG. 7B depicts an isometric view of one of the pair of the tank racks of FIG. 7A according to one or more embodiments shown and described herein.

FIG. 5 depicts an elevated rack 100. The elevated rack comprises a plurality of risers 102, a plurality of legs 104, and a platform 106. The plurality of legs 104 are coupled to the platform 106 and position the platform 106 above the frame 10 of FIG. 1. The plurality of legs 104 are configured to either couple with a leg stud 110 (FIG. 6A) or the keyhole slot 112 (FIG. 6A) of one or more risers 102 coupled to the frame 10. Each leg's 104 length may be expanded or contracted to change the elevation (or distance) of the platform 106 above (or from) the bed 25 (FIG. 1) or frame 10. The platform 106 comprises a plurality of substantially parallel securement tracks 15 and an upper platform surface 107 or the underside of the platform 106. The elevated rack 100 permits the stretcher 5 to hold a patient and equipment and/or devices.

The platform 106 may be pivotally coupled to the plurality of legs 104 such that the platform 106 may be articulated vertically to allow access to an area A underneath the platform 106. A platform lock 109 may restrain the movement of the platform 106 with it is in the locked position. Each leg 104 may comprises either a mount stud (e.g., mount stud 30, FIG. 3B) or a keyhole slot (e.g., keyhole slot 112, FIG. 6A) such they may couple with the riser 102. In one embodiment, each leg may only comprise a mount stud (e.g., mount stud 30, FIG. 3B) such that the elevated rack 100 may couple with the securement tracks 15 of the frame 10 directly without the need for the risers 102.

FIGS. 6A and 6B depict two embodiments of the riser 102. The riser 102 comprises one or more frame studs 108, a leg stud 110, and a keyhole slot 112. The riser couples to the frame 10 (FIG. 1) and elevates the leg stud 110 and the keyhole slot 112 above the upper surface 16 of the frame 10. Each frame stud 108 is a mount stud 30 (FIG. 3B) configured to couple with the securement track 15 (FIG. 1) of the frame 10. The leg stud 110 is a mount stud 30 that is diametrically opposed to the frame studs 108 on the riser 102. The riser 102 may also include a securement track 15 along the upper surface 103 of a riser body 105. FIG. 6A depicts a riser 102 with a low height H and FIG. 6B depicts a riser 102 embodiment with a larger height H' when compared to the riser 102 of FIG. 6A. The height H and H' raise any equipment or device coupled to the riser 102 above a plane defined by the frame 10 of FIG. 1. Each riser may include a locking pin 8 and a locking pin release 9. The operation of the locking pin 8 and the locking pin release 9 is described herein before in relation to FIG. 3C.

Referring to FIGS. 5 and 6C, the elevated rack may also include a tank assembly 115 and one or more IV bag hangers 120. The tank assembly 115 comprises a tank frame 116 and one or more adjustable bands 117. The adjustable bands 117 are coupled to the tank frame 116 and configured to secure a tank 118 (e.g., oxygen, nitric oxide, and the like) to the tank frame 116. The tank frame 116 may be coupled to the elevated rack 100. The adjustable bands 117 are configured to retain a tank 118 and permit removal of the tank 118. The tank assembly 115 may be coupled to the underside of the platform 106. In one embodiment, the tank assembly 115 may be coupled to the plurality of legs 104.

The IV bag hanger 120 comprises an IV hook 121, a restraint strap 122, and a telescoping pole 123. The telescoping pole 123 slidably couples with one leg 104 of the elevated rack 100. The IV hook 121 is coupled at a distal end of the telescoping pole 123 and the restrain strap 122 is coupled to the telescoping pole 123 and configured to restrain an IV bag from swinging on the IV hook 121. In one embodiment, the telescoping pole 123 is configured to lock such that a length LL is maintained and allow adjustment of the length LL when a release button 124 is depressed.

FIGS. 7A and 7B depict a tank rack 130. The tank rack 130 comprises one or more adjustable bands 131, a tank base 132, a first mount end 133, and a second mount end 134. The adjustable bands 131 are coupled to the tank base 132 and configured to secure a tank 118 to the tank base 132. The first mount end 133 and the second mount end 134 are coupled at opposing ends of the tank base 132. The tank base 132 spans between the first parallel frame member 11 and the second parallel frame member 12 such that the first mount end 133 couples to the securement track 15 on the first parallel frame member 11 and the second mount end 134 couples to the securement track 15 on the second parallel frame member 12. Each mount end 133, 134 comprises one or more mount studs (e.g., mount stud 30, FIG. 3B), a lock pin, and a locking pin release 9. The operation of the locking pin and the locking pin release 9 is described herein before in relation to FIG. 3C. FIG. 7A depicts the tank rack 130 coupled to the securement plate 85.

FIG. 8 depicts a side view of the stretcher 5. In this configuration, the stretcher 5 includes a tank rack 130 and an elevated rack 100 with an IV bag hanger 120 in the extended position. In this embodiment, the stretcher 5 has a length l' which allows for both the elevated rack 100, tank rack 130, and a patient 1 to occupy the stretcher 5.

Figure 9:
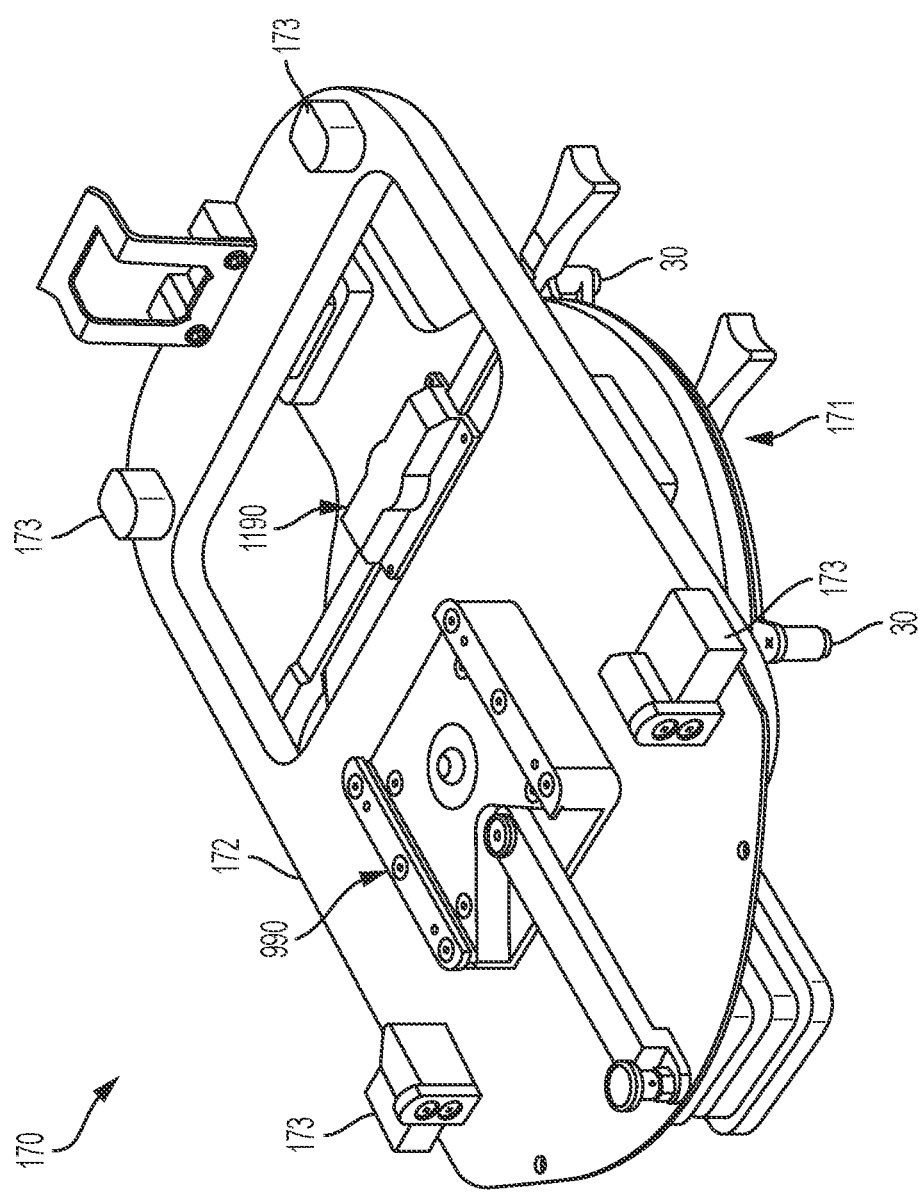
FIG. 9 depicts an isometric view of a swivel mount coupleable to the frame of the stretcher of FIG. 1 according to one or more embodiments shown and described herein.

Referring to FIG. 9, the stretcher 5 may also include a swivel tray 170 that includes a swivel tray mount 171 and a tray 172 rotatably connected to the swivel tray mount 171 and a receiver 404 mounted to the swivel tray 402. The swivel tray 170 may include one or more device bumpers 173. Each device bumper 173 may be configured to couple with a recess on a device that is coupled to the swivel tray 170. For example, an E/G meter may have one or more recesses on the bottom of its case. The device bumpers 173 may vary in location and/or form to matedly couple with those recesses to retain the example E/G meter on the swivel tray 170. A universal adaptor 990 may be coupled to the swivel tray 170 to retain a device or equipment to the swivel tray 170. The universal adaptor 990 is shown and described in detail in PCT/US2014/015898. Likewise a release mechanism 1190 and one or more mount studs 30 (FIG. 3B) may be used to releaseably couple the swivel tray mount 171 to the securement plate 85 of the stretcher 5 and is shown and described in PCT/US2014/015898. The swivel tray 170 may be the same or similar to any of the mounts as shown and described in PCT/US2014/015898.

Figure 10:
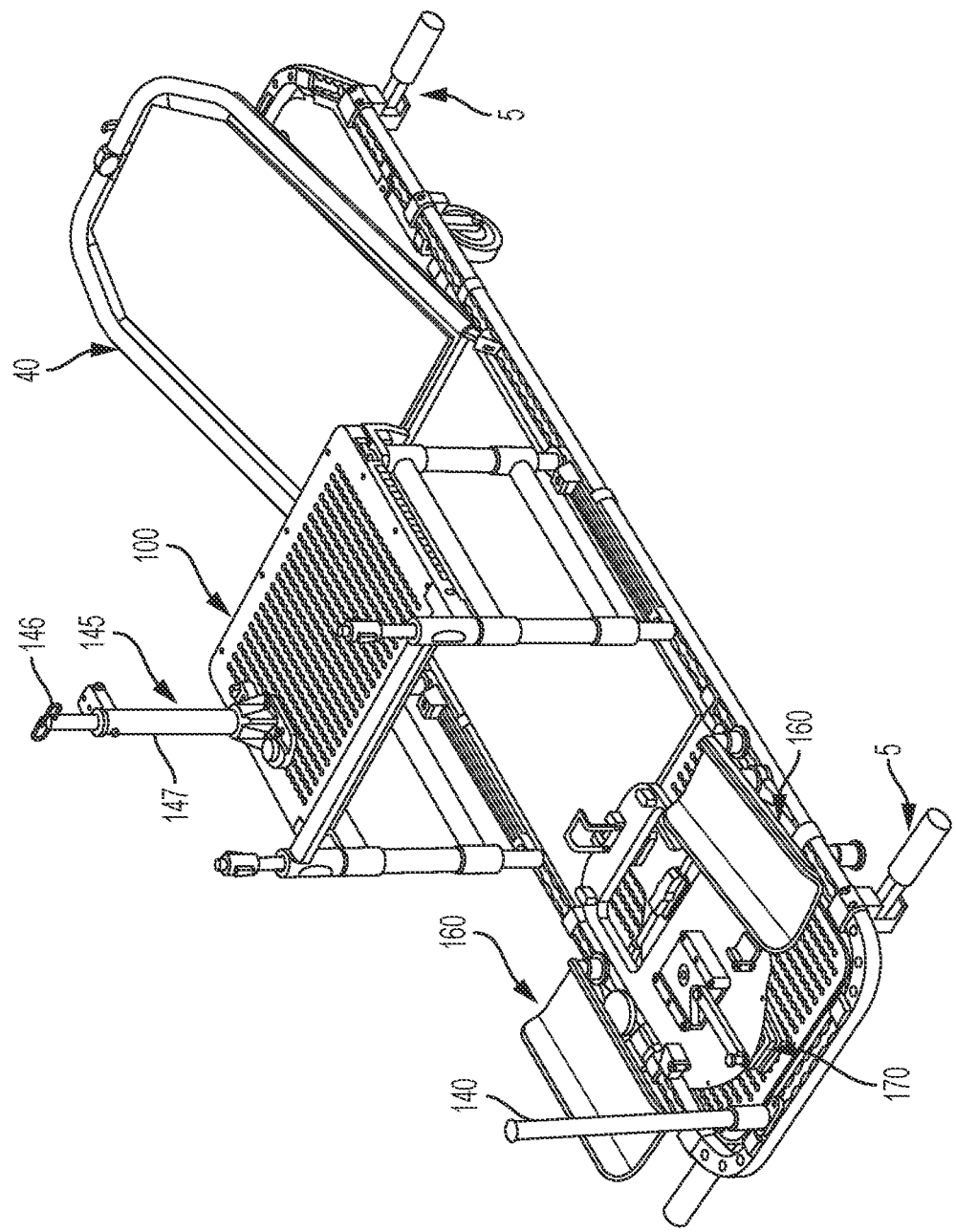
FIG. 10 depicts a perspective view of another configuration of the stretcher of FIG. 1 configured with the angular support of FIG. 4A, the elevated rack of FIG. 5, a plurality of the handles each according to FIG. 3E, a pair of leg supports each according to FIG. 3F, and the swivel mount of FIG. 9, according to one or more embodiments shown and described herein.

FIG. 10 depicts another configuration of the stretcher 5 configured to hold an adult patient or child patient. In this configuration, the stretcher 5 is configurable and/or configured with some or all of the equipment to support and/or perform extracorporeal membrane oxygenation (ECMO) procedure and/or therapy of a patient while in transport. As shown, the stretcher 5 includes an elevated rack 100, an angular support 40, a device pole assembly 140, a device and cord organizer pole assembly 145, a pair of leg supports 160, a plurality of handles 5, and a swivel mount 170 connected and/or mounted to the frame 10. The device pole assembly 140 provides an attachment point for medical devices and other equipment. The device and cord organizer pole assembly 145 also provides an attachment point for medical devices and other equipment and includes a wire wrap 146 to retain wires and other accessories coupled to the medical devices and other equipment. The wire wrap 146 is coupled to a telescoping pole 147 which allows the wire wrap 146 to be elevated above the medical device or equipment coupled to the device and cord organizer pole assembly 145. Illustrative equipment pole assemblies are shown and described in PCT/US2014/015898.

Figure 3F:
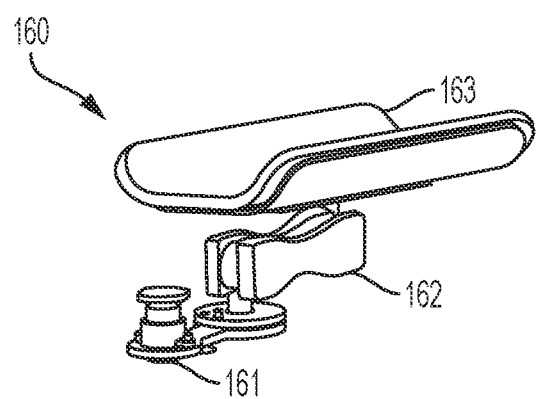
FIG. 3F depicts an isometric view of a leg support coupleable to the frame of the stretcher of FIG. 1 according to one or more embodiments shown and described herein.

Referring to FIGS. 3F and 10, the pair of leg supports 160. Each leg support 160 may include a leg support mount 161 operable to connect and/or mount the leg support 160 to a securement track 15 as shown and described herein, thus enabling the leg support 160 is configured to couple with the securement track 15, slide therealong, and once in a desired location, be secured or locked into place. Each leg support 160 also may include a leg support member 162 movably connected to the leg support mount 161. In certain embodiments, the connection between the leg support member 162 and leg support mount 161 may be a ball joint or other conventional mechanisms that permit one or more axis movement of the leg support member 162 relative to the leg support mount 161. In addition, each leg support 160 may include a leg support tray 163 that is movably connected to an end of the leg support member 162 opposite the end connected to the leg support mount 161. In certain embodiments, the leg support tray 163 may be movably connected to the leg support member 162 with a multi-axis ball joint or other conventional mechanisms that permit one or more axis movement of the leg support tray 163 relative to the leg support member 162.

Figure 11:
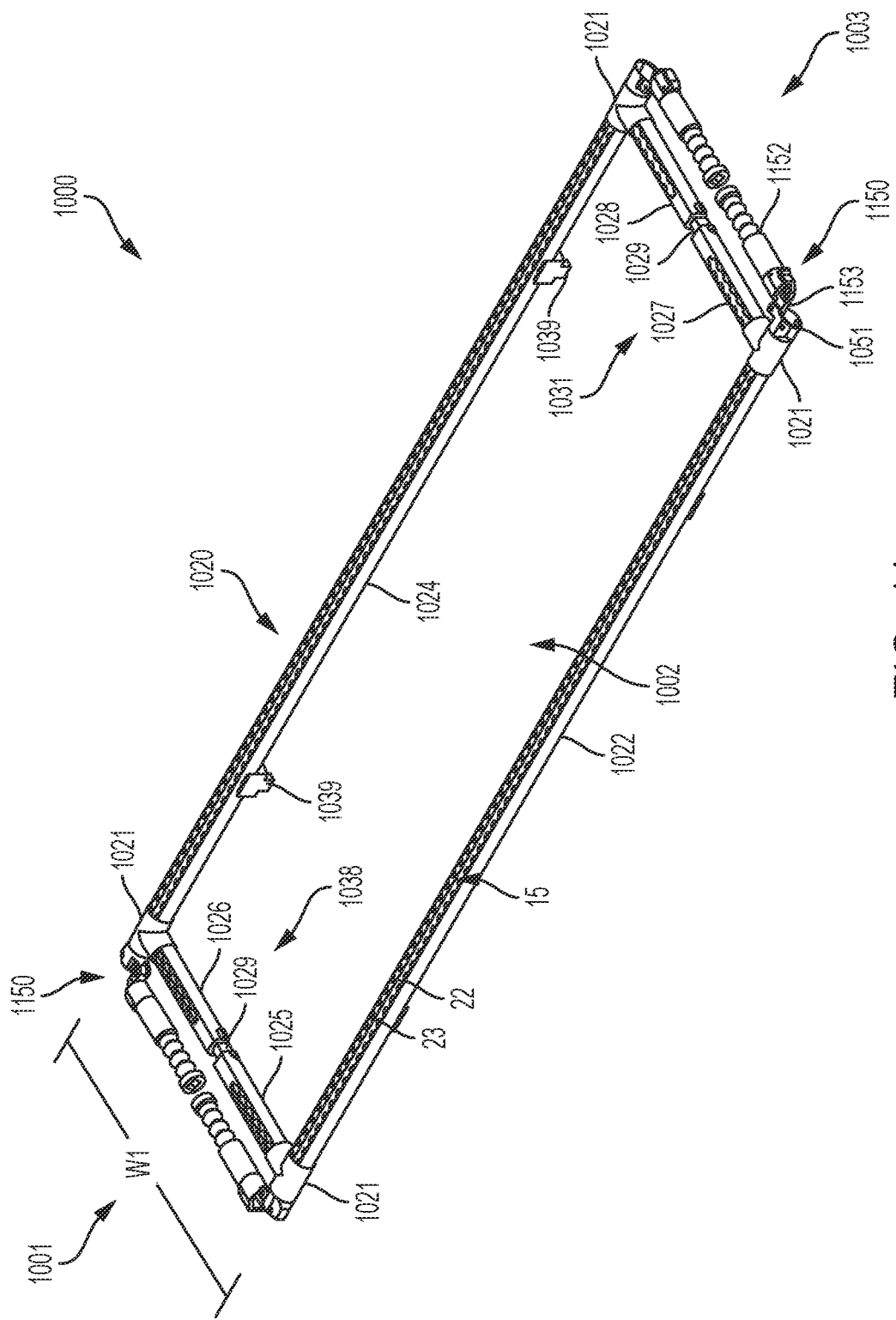
FIG. 11 depicts a perspective view of a litter according to one or more embodiments shown and described herein.
Figure 12:
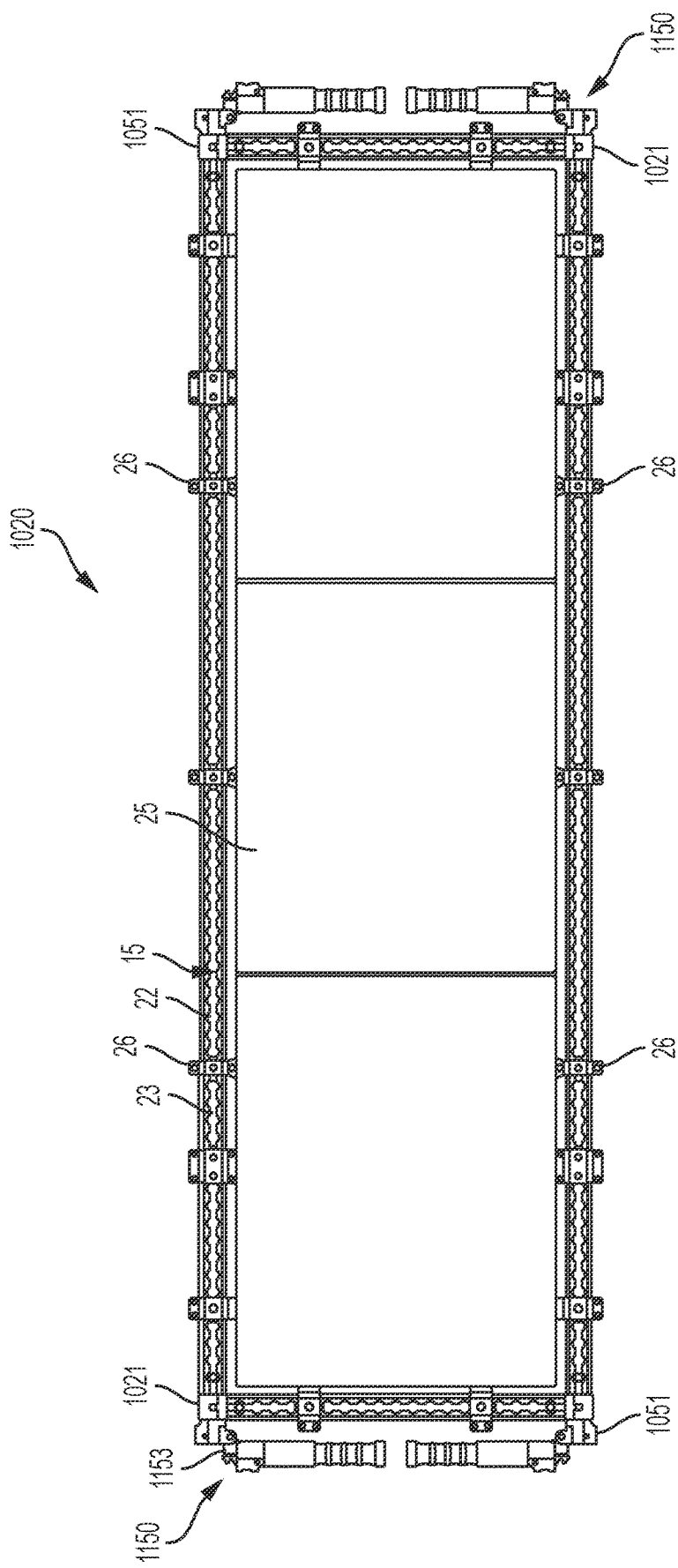
FIG. 12 depicts a top view of the litter according to one or more embodiments shown and described herein.
Figure 13:
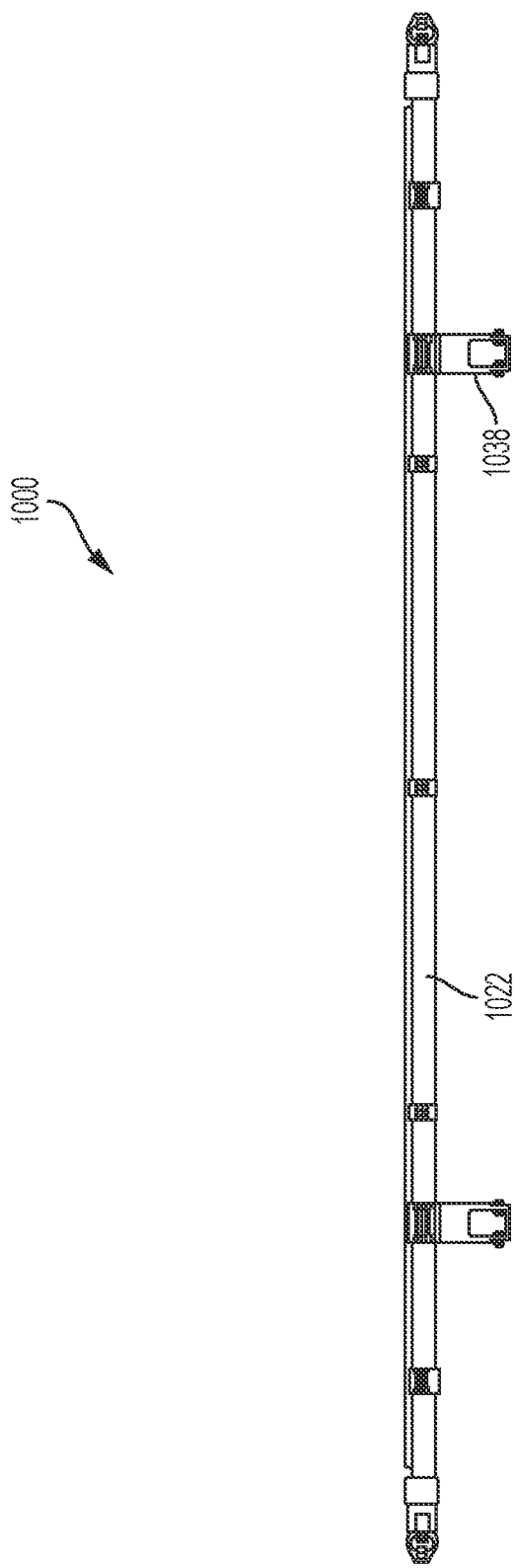
FIG. 13 depicts a side view of the litter according to one or more embodiments shown and described herein.

Referring to FIGS. 11-13 depict a litter 1000. The litter 1000 includes a frame 1020 having first and second frame member 1022, 1024, respectively and a first end 1001 and a second end 1003. The litter 1000 may also include a third and fourth frame member 1038, 1031 respectively. The third frame member 1038 comprises a first member 1025 and a second member 1026, which are connected together with a tie connector 1029 and are positioned between and coupled to an end of each of the first and second members 1022, 1024, respectively. The fourth frame member 1031 comprises a third and fourth member 1027, 1028, respectively, that are connected together with a tie connector 1029 and are positioned between and connected to an end of each of the first and second members 1022, 1024, respectively, opposite the first and second frame members 1022, 1024. The tie connector 1029 enables the third and fourth frame members 1038 and 1031 respectively to vary the width W1 of the litter 1000. The tie connector 1029 may rotatably couple a threaded aperture on both members such that as the tie connector 1029 is rotated, the width W1 of the litter 1000 is changed. In one embodiment, the tie connector 1029 may comprise a plurality of apertures and the members may comprise a bolt aperture such that the width W1 of the litter 1000 is adjusted and a bolt is secured in the bolt aperture and the aperture of the tie connector 1029 to fix the width W1.

The frame 1020 may also include one or more connecting tees 1021 which couple the ends of the first and second members 1022, 1024, to respective ends of the third and fourth members 1025, 1026, and the opposite ends of the first and second members 1022, 1024, respectively, with the ends of the fifth and sixth members, 1027, 1028. The members are sized such that they insert into the ends of the connecting tees 1021. The tie connector 1029 may be a tube-like or rod-like device that has a smaller diameter or cross-sectional dimension than the inner diameter or cross sectional dimension of the members 1025, 1026, 1027, 1028, yet large enough to create a frictional fit. In other embodiments, the tie connector 1029 may include snap-fit connections, spring loaded buttons that insert into corresponding apertures on the members or any other conventional mechanisms and methods of connecting to members.

On a surface (for example, an upper surface) of one or more of the frame members, one or more securement tracks 15 may be disposed therein. In the space 1002 a bed 25 may be disposed and connected to one or more of the members. The bed 25 may be a flexible substrate such as a natural or synthetic cloth or other like materials made from natural or synthetic materials such as, for example any materials commonly used on emergency and/or military rescue litters, including but not limited to polymers, nylons, canvas, composite materials, and/or combinations thereof. The bed 25 may, in other embodiments, be a semi-rigid or rigid material such as metals, plastics, composites, and/or combinations thereof. The bed 25 may comprise any number of cushions or gel pads as well known in the art. Any number of mechanisms and methods of connecting the bed 25 to the members may be used as well known in the art. The bed 1030 may include bed mounts 26 that are connected to the bed 25 and also connect and/or mount the bed to one or more of the securement tracks 15 as shown and described herein.

In addition, the litter 1000 may include one or more handles 1150 (e.g., handle 5, FIG. 1) couple to and/or mounted to the frame 1020 or the connecting tees 1021. The handle 1150 may have a handle mount 1151 and a handle member 1152 that may be sized such that it may be inserted into one of the ends of a connecting tee 1021. The handle mount 1151 may be held within and/or connected to the tee via a friction fit, a snap fit, a pin biased into a corresponding aperture, a screw, bolt and nut, a weld, or any other well known connection mechanisms and methods. The handle 1150 may further include a joint 1153 that enables the handle to move in one or more axes of direction relative to the handle mount 1151. In one embodiment, the handle may move about a vertical axis between a position wherein the handle is substantially aligned with the first and/or second members 1022 and/or 1024 or a second position wherein the handle is moved inwardly to a position substantially perpendicular to the first and second members 1022, 1024 about a vertical axis. One or more litter feet 1039 (e.g., leg 35, FIG. 1) may be connected and/or mounted to the frame 1020 using any mechanism and/or method shown and described herein or as conventionally known. In one embodiment, the litter feet 1039 may be used to secure the litter 1000 to a mobile platform (not shown) with one or more wheels. The mobile platform may be a Ferno's FTS Folding Transport System for example.

Figure 14C:
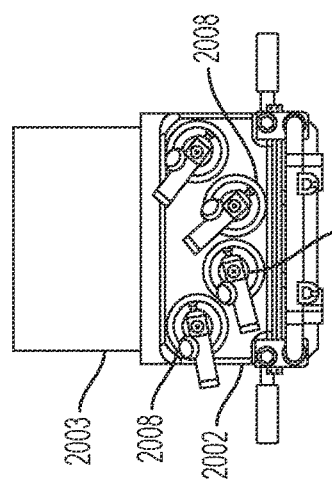
FIG. 14C depicts a front view of the second embodiment of the litter according to one or more embodiments shown and described herein.
Figure 14A:
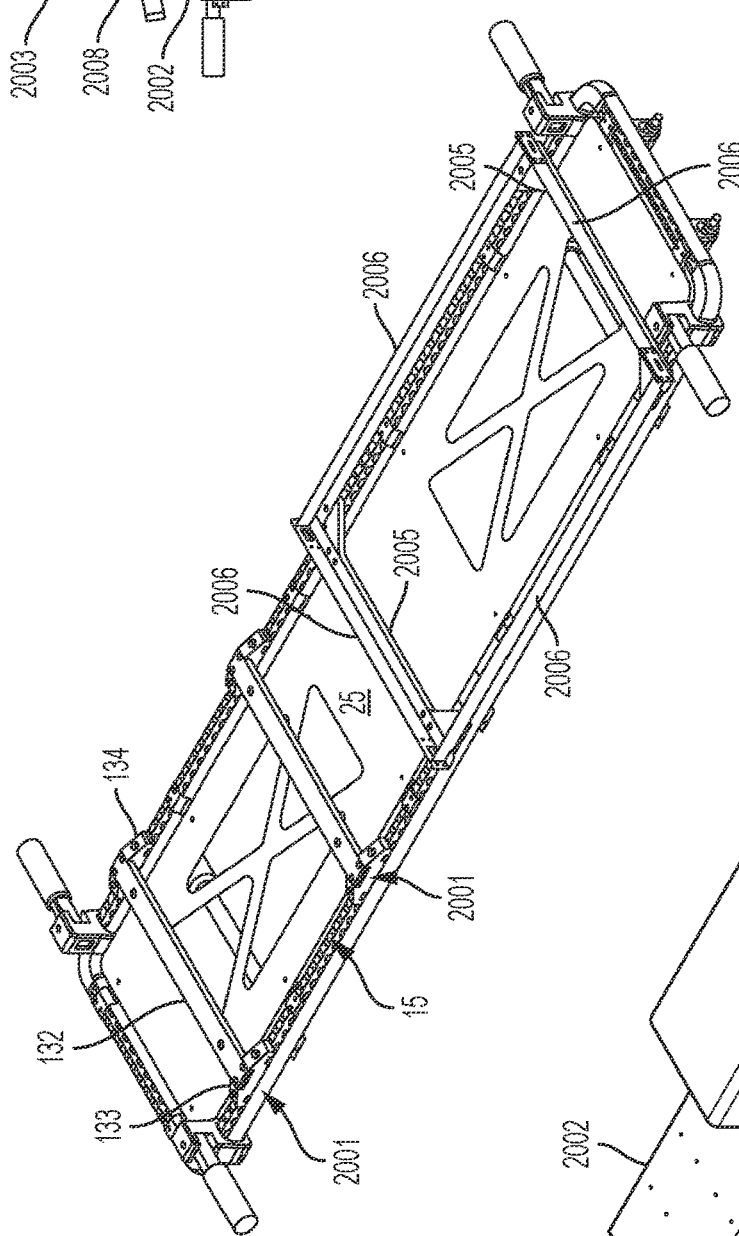
FIG. 14A depicts a perspective view of a second embodiment of the litter according to one or more embodiments shown and described herein.
Figure 14B:
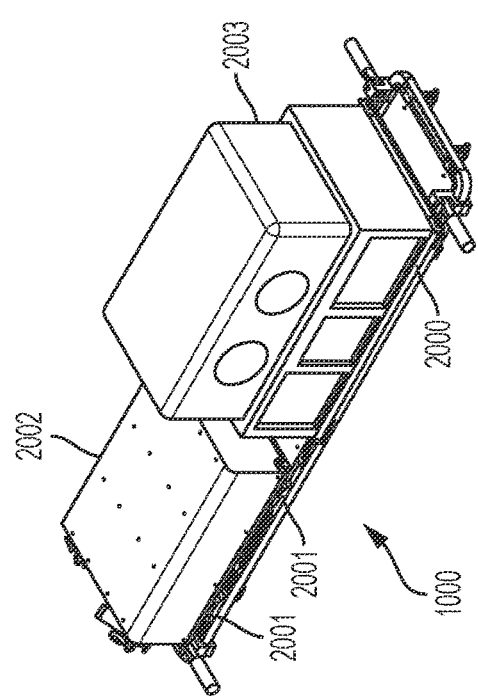
FIG. 14B depicts a perspective view of the second embodiment of the litter according to one or more embodiments shown and described herein.

FIGS. 14A, 14B, and 14C depict the litter 1000 with incubation equipment attached. The litter 1000 includes an incubator frame 2000, a tank rack 2001, and a tank enclosure 2002. The incubator frame 2000 comprises a plurality of track mounts 2005 and four angle beams 2006 coupled at right angles to define a box-like frame configured to secure an incubator 2003 therein. The track mounts 2005 comprise at least one mount stud (e.g., mount stud 30, FIG. 3B). The box-like frame couples to the track mounts 2005 which in turn, couple with the securement track 15 of the litter 1000. The tank rack 2001 comprises a tank base 132, a first mount end 133, and a second mount end 134 as discussed herein before in relation to FIG. 7B. Although the tank rack 2001 differs from the tank rack 130 in FIG. 7B, they function the same. In FIG. 14A, for example, the first mount end 133 and the second mount end 134 have a bridge-like structure to raise the tank enclosure 2002 above the bed 25 of the litter 1000. It should be understood that the tank rack 2001 may also include the locking pin 8 and locking pin release 9 as shown and described in relation to FIG. 3C. The tank enclosure 2002 comprises one or more tank pockets 2008 configured to retain a tank 118 within and the tank enclosure 2002 is coupled to one or more tank racks 2001.

Referring back to FIG. 3C, each mount described herein with a mount stud 30 (FIG. 3B) may include a snubber function as shown and described in PCT/US2014/015898. Broadly, the snubber function either applies a pressure between the securement track 15 (FIG. 1) and the locking pin 8 or it retracts the mounting studs 30 into the mount to take up the loose tolerance between the mount and the securement track 15. It should also be noted that the mounts, securement tracks, stretchers, and litters are crash-ready which means that a device, equipment, mount, track, fastening devices, or a structure may be configured to survive an inertial force, an impact, a vehicle crash, or a sudden vehicle maneuver and retain functionality afterwards where the force exerted upon the device, equipment, mount, track, fastening devices, or a structure may exceed about 15 Gs (i.e., units of gravitational force or g-force) in a fore-aft direction and exceed about 17 Gs in a lateral direction. In other embodiments, the force exerted upon the device, equipment, mount, track, fastening devices, or a structure may exceed about 22 Gs (i.e., units of gravitational force or g-force) in a fore-aft direction and exceed about 26 Gs in a lateral direction.

All the embodiments and the components and/or features shown and described herein are interchangeable, replaceable, removable modifiable, and/or may be added to different embodiments. As such, some or all of the features, components, and equipment of the stretchers of FIGS. 1-10 may be added to the litters of FIGS. 11-14 and vice versa.

One or more of the embodiments of the stretchers and/or litters shown and described herein are optionally configurable to support extracorporeal membrane oxygenation (ECMO) procedure and/or therapy of a patient while in transport. ECMO is a procedure/therapy wherein non-oxygenated blood is removed from the venous system, oxygenated, and then placed back into or returned to the patient's body through either the arterial or venous system to provide pulmonary or cardiac reinforcement and/or sustainment. As such, the following illustrative equipment used in the ECMO procedure and/or therapy may include air bubble detectors; filters; and pressure, oxygenation and temperature monitors. The air bubble detectors identify micro-bubbles and turn off the pump if micro-bubbles are found. The filters screen for air or thrombi to prevent embolization. The monitors monitor and protect against dangerous changes in the pressure of blood in the apparatus, and also monitor oxygen saturation and temperature of the blood before the blood reenter into the patient. Each of the illustrative equipment may include one or more of the mounts that are similar to and/or the same as the mounts as shown and described herein to enable this equipment, separately or jointly, to be connected and/or mounted to one or more of the securement tracks 15 along the stretcher or litter.

Unless otherwise defined, all technical and scientific terms used herein have the same meaning as commonly understood by one of ordinary skill in the art to which the claimed subject matter belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

Certain terminology is used in the disclosure for convenience only and is not limiting. The words "left", "right", "front", "back", "upper", and "lower" designate directions in the drawings to which reference is made. The terminology includes the words noted above as well as derivatives thereof and words of similar import.

As used herein, "pivotally coupled" means that two objects coupled together to resist linear motion and to facilitate rotation or oscillation between the objects.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A stretcher comprising:
a bed;
a frame having first and second parallel frame members each with respective ends coupled via an interference fit to a first set of lateral frame members each having a first length to provide the frame with a first width, wherein the first set of lateral frame members are both decouplable from the respective ends of the first and second parallel frame members via an untightening of the interference fit and replaceable by a second set of lateral frame members each having a second length to provide the frame with a second width different from the first width;
a securement track defined by an upper surface of at least one of the first parallel frame member, the second parallel frame member, the first lateral frame member, and the second lateral frame member, the securement track having a plurality of alternating open regions and necked down regions along a length;
a bed mount configured to both support the bed and be releasably secured in the securement track in a secure condition, and configured to be repositionable along the length of the securement track in an unsecured condition; and
an angular support movably secured to the securement track through a plurality of track mounts such that the angular support may be placed along a plurality of positions along the length of the securement track.

2. The stretcher as claimed in claim 1, wherein:
the plurality of open regions are connected by the plurality of necked down regions; and
each bed mount comprises a mount stud having a stem portion and an enlarged head portion disposed at a distal end of respective stem portions,
the head portion is configured to removably couple with respective open regions of the securement track,
the stem portion is configured to slidably couple with the necked down portion of the securement track, and
the bed mounts are spaced around the frame and couple the securement track to the bed, and repositionable along the length in the unsecured condition via sliding within the securement track.

3. The stretcher as claimed in claim 1 wherein the angular support comprises a support frame, a support bed, a first track mount, a second track mount, a first end member, a second end member; a cross member, and a link member wherein:
the support frame comprises a first support member, a second support member, and a support lateral member;
the support lateral member couples the first support member and the second support member at a first end of the support frame;
the first track mount and the second track mount are pivotally coupled to the support frame;
the first track mount and the second track mount each comprise at least one mount stud;
the link member comprises a first link body, a second link body, a link lock, and a link lock release;
the first link body slidably couples with the second link body;
the link lock restrains the movement of the first link body in relation to the second link body;
the link lock release transitions the link lock between a locked position and an unlocked position;
the locked position restrains the movement of the first link body in relation to the second link body;
the unlocked position does not restrain the movement of the first link body in relation to the second link body;
the link member couples the angular support to the cross member; and
the cross member couples the first parallel frame member and the second parallel frame member.

4. The stretcher as claimed in claim 1 wherein:
each track mount comprises a locking pin and a locking pin release;
the locking pin release is coupled to the locking pin and is configured to transition the locking pin between an extended position and a retracted position;

the extended position extends the locking pin into an open region of the securement track and restrains the movement of the track mount in relation to the securement track; and the retracted position retracts the locking pin out of an open region of the securement track and allows the movement of the track mount in relation to the securement track.

5. The stretcher as claimed in claim 1 comprising a securement plate comprising a base plate and a plurality of substantially parallel securement tracks wherein the base plate is coupled to the frame with the plurality of bed mounts.

6. The stretcher as claimed in claim 1 comprising a plurality of ribs and one or more legs wherein:
   each rib comprises a rib lateral and two rib mounts;
   each rib mount is coupled to either end of the rib lateral;
   the rib couples between the first parallel frame member and the second parallel frame member;
   select ones of the plurality of ribs comprise one or more wheels;
   each leg comprises a leg member and a leg mount;
   the leg member is coupled to the leg mount;
   the leg mount comprises one or more mount studs;
   the mount stud is coupled to the leg mount; and
   each leg is coupled to the securement track.

7. The stretcher as claimed in claim 1 comprising an elevated rack wherein:
   the elevated rack comprises a plurality of risers, a plurality of legs, and a platform;
   each riser comprises one or more frame studs, a leg stud, and a keyhole slot;
   each riser couples to the frame and elevates the leg stud and the keyhole slot above the upper surface of the frame;
   each frame stud is a mount stud configured to couple with the securement track of the frame;
   the leg stud is a mount stud that is diametrically opposed to the frame studs on the riser;
   the plurality of legs are coupled to the platform and position the platform above the frame;
   the plurality of legs are configured to either couple with the leg stud or the keyhole slot of one or more risers coupled to the frame; and
   the platform comprises a plurality of substantially parallel securement tracks.

8. The stretcher as claimed in claim 7 wherein the elevated rack comprises a tank assembly and one or more IV bag hangers;
   the tank assembly comprises a tank frame and one or more adjustable bands;
   the adjustable bands are coupled to the tank frame and configured to secure a tank to the tank frame;
   the tank frame is coupled to the elevated rack;
   each IV bag hanger comprises an IV hook, a restraint strap, and a telescoping pole;
   the telescoping pole slidably couples with one leg of the elevated rack;
   the IV hook is coupled at a distal end of the telescoping pole; and
   the restrain strap is coupled to the telescoping pole and configured to restrain an IV bag from swinging on the IV hook.

9. The stretcher as claimed in claim 7 wherein:
   each riser comprises a locking pin and a locking pin release;
   the locking pin release is coupled to the locking pin and is configured to transition the locking pin between an extended position and a retracted position;
   the extended position extends the locking pin into an open region of the securement track and restrains the movement of the riser in relation to the securement track; and
   the retracted position retracts the locking pin out of an open region of the securement track and allows the movement of the riser in relation to the securement track.

10. The stretcher as claimed in claim 1 comprising a tank rack wherein:
    the tank rack comprises one or more adjustable bands, a tank base, a first mount end, and a second mount end;
    the adjustable bands are coupled to the tank base and configured to secure a tank to the tank base;
    the first mount end and the second mount end are coupled at opposing ends of the tank base;
    the tank base spans between the first parallel frame member and the second parallel frame member such that the first mount end couples to the securement track on the first parallel frame member and the second mount end couples to the securement track on the second parallel frame member;
    each mount end comprises one or more mount studs, a locking pin, and a locking pin release;
    the locking pin release is coupled to the locking pin and is configured to transition the locking pin between an extended position and a retracted position;
    the extended position extends the locking pin into an open region of the securement track and restrains the movement of the mount end in relation to the securement track; and
    the retracted position retracts the locking pin out of an open region of the securement track and allows the movement of the mount end in relation to the securement track.

11. The stretcher as claimed in claim 1 comprising a plurality of handles wherein:
    each handle comprises a handle member coupled to a handle mount;
    the handle mount comprises at least one mount stud; and
    the handle member is pivotally coupled to a respective handle mount.

12. The stretcher as claimed in claim 1 wherein the first and second parallel frame members form a first set of parallel frame members having a first length and which are replaceable by a second set of parallel frame members having a second length different from the first length via the untightening of the interference fit.

13. The stretcher as claimed in claim 1 wherein each of the plurality of track mounts are configured to fit within the securement track through a corresponding one of the alternating open regions and necked down regions along the length.

* * * * *